United States Patent [19]
Kilker et al.

[11] Patent Number: 5,979,256
[45] Date of Patent: Nov. 9, 1999

[54] GEAR DRIVE WINDOW WIPER AND MULTI-FUNCTION ELECTRIC MOTOR

[75] Inventors: Daniel D. Kilker, Canton; Steven L. Reau, Livonia, both of Mich.

[73] Assignee: UT Automotive Dearborn, Inc., Dearborn, Mich.

[21] Appl. No.: 08/948,010

[22] Filed: Oct. 9, 1997

[51] Int. Cl.⁶ .................................................... F16H 27/02
[52] U.S. Cl. .......................... 74/89.16; 74/435; 74/89.14; 15/250.3
[58] Field of Search .................................. 74/435, 89.14, 74/89, 89.16, 471 R, 480 R, 89.18; 15/250.13, 250.16, 250.17, 250.3, 250.31

[56] References Cited

U.S. PATENT DOCUMENTS

| | | |
|---|---|---|
| 2,271,207 | 1/1942 | Rhein . |
| 2,345,778 | 4/1944 | Lammeren et al. . |

(List continued on next page.)

FOREIGN PATENT DOCUMENTS

| | | |
|---|---|---|
| 0 345 002 A2 | 6/1989 | European Pat. Off. . |
| 1281424 | 12/1961 | France . |
| 822 178 | 11/1951 | Germany . |
| 28 16 207 A1 | 10/1979 | Germany . |
| 3807087 A1 | 9/1989 | Germany . |
| 39 23 688 A1 | 1/1991 | Germany . |
| 43 13 363 A1 | 11/1993 | Germany . |
| 43 37 760 A1 | 5/1994 | Germany . |
| 56-22150 | 2/1981 | Japan . |
| 5-86761 | 6/1993 | Japan . |
| 2 153 218 | 8/1985 | United Kingdom . |
| WO 96/33891 | 10/1996 | WIPO . |
| WO 96/33892 | 10/1996 | WIPO . |
| WO 96/33893 | 10/1996 | WIPO . |

OTHER PUBLICATIONS

Automotive Handbook, Bosch 3rd Edition, 1993, pp. 694–697.
Kinematic Analysis of Mechanisms, 1959, J. E. Shigley, pp. 228–231.
"Goodheart–Wilcox Automotive Encyclopedia", William K. Toboldt, Larry Johnson, Steven W. Olive, 1989, pp. 723–727.
"Genevamation Indexing Drives", Jan. 12, 1995 Catalog No. 693, Geneva Mechanisms Corporation.
"Saab 900 Owners Workshop Manual", Haynes Publishing Group, 1979 through 1985, pp. 172–174, 237.
Machine Design, "Basics of Design Engineering", Jun. 1992, Article "Mechanical Systems".
A paper from the Third Conference on Mechanisms, "A Survey of Intermittent–Motion", F.J. Bogardus, 1956, pp. 8–15.
Machine Design, Mechanisms for Intermittent Motion, Dec. 1951, Otto Lichtwitz, pp. 134–148.
"Mechanisms for Providing Intermittent Rotary Motion", Product Engineering, Aug. 1949, pp. 116–117.
Machine Design, Mechanisms for Intermittent Motion, "Part 2", Jan. 1952, Otto Lichtwitz, pp. 127–141.
Machine Design, Mechanisms for Intermittent Motion, "Part 3", Feb. 1952, Otto Lichtwitz, pp. 146–155.
Machine Design, Mechanisms for Intermittent Motion, "Part 4", Mar. 1952, Otto Lichtwitz, pp. 147–155.

(List continued on next page.)

*Primary Examiner*—Charles A Marmor
*Assistant Examiner*—Ankur Parekh
*Attorney, Agent, or Firm*—Harness, Dickey & Pierce, P.L.C.

[57] ABSTRACT

A multi-functional apparatus that employs a gear drive window wiper and multi-function electric motor is described. The apparatus uses a gear system powered by a reversible electric motor that allows one intermittent motion mechanism to be actuated, while simultaneously preventing another intermittent motion mechanism from being actuated.

20 Claims, 9 Drawing Sheets

U.S. PATENT DOCUMENTS

| | | |
|---|---|---|
| 2,615,945 | 10/1952 | Jaeschke . |
| 2,659,237 | 11/1953 | Wood . |
| 2,722,617 | 11/1955 | Cluwen et al. . |
| 2,953,802 | 9/1960 | Ziegler . |
| 2,959,803 | 11/1960 | Ziegler . |
| 3,163,791 | 12/1964 | Carlson . |
| 3,361,005 | 1/1968 | Carpenter . |
| 3,361,947 | 1/1968 | Schlebusch . |
| 3,421,380 | 1/1969 | Mansour . |
| 3,442,146 | 5/1969 | Simpson . |
| 3,443,442 | 5/1969 | Schweihs . |
| 3,443,455 | 5/1969 | Zugel . |
| 3,516,610 | 6/1970 | Stevens . |
| 3,523,204 | 8/1970 | Rand . |
| 3,574,882 | 4/1971 | Petry . |
| 3,619,676 | 11/1971 | Kawakami . |
| 3,659,128 | 4/1972 | Danek . |
| 3,665,772 | 5/1972 | Beard et al. . |
| 3,688,332 | 9/1972 | Bellware . |
| 3,689,817 | 9/1972 | Elliott . |
| 3,694,723 | 9/1972 | Schneider et al. . |
| 3,705,520 | 12/1972 | Carpenter . |
| 3,803,627 | 4/1974 | Schuscheng . |
| 3,858,922 | 1/1975 | Yamanaka . |
| 3,917,330 | 11/1975 | Quantz . |
| 3,927,436 | 12/1975 | Inoue et al. . |
| 4,009,952 | 3/1977 | Badalich et al. . |
| 4,065,234 | 12/1977 | Yoshiyuki et al. . |
| 4,158,159 | 6/1979 | Orris et al. . |
| 4,173,055 | 11/1979 | Izumi et al. . |
| 4,183,114 | 1/1980 | Eden . |
| 4,259,624 | 3/1981 | Seibicke . |
| 4,271,381 | 6/1981 | Munz et al. . |
| 4,309,646 | 1/1982 | Liedtke et al. . |
| 4,336,482 | 6/1982 | Goertler et al. . |
| 4,352,299 | 10/1982 | Riggs et al. . |
| 4,422,522 | 12/1983 | Slavin et al. . |
| 4,434,678 | 3/1984 | Maus . |
| 4,450,390 | 5/1984 | Andrei-Alexandru et al. . |
| 4,478,004 | 10/1984 | Andrei-Alexandru et al. . |
| 4,492,904 | 1/1985 | Graham . |
| 4,507,711 | 3/1985 | Ono et al. . |
| 4,553,656 | 11/1985 | Lense . |
| 4,573,723 | 3/1986 | Morita et al. . |
| 4,630,178 | 12/1986 | Mugford et al. . |
| 4,638,386 | 1/1987 | Takamatsu . |
| 4,639,065 | 1/1987 | Kohler et al. . |
| 4,660,698 | 4/1987 | Miura . |
| 4,674,781 | 6/1987 | Reece et al. . |
| 4,701,972 | 10/1987 | Saito . |
| 4,702,117 | 10/1987 | Tsutsumi et al. . |
| 4,724,760 | 2/1988 | Bubley . |
| 4,733,147 | 3/1988 | Muller et al. . |
| 4,793,640 | 12/1988 | Stewart, Sr. . |
| 4,875,053 | 10/1989 | Harada . |
| 4,878,398 | 11/1989 | Heinrich . |
| 4,885,512 | 12/1989 | Gille et al. . |
| 4,893,039 | 1/1990 | Isii . |
| 4,918,272 | 4/1990 | Nishikawa . |
| 5,007,131 | 4/1991 | Chevalier et al. . |
| 5,023,530 | 6/1991 | Ohashi et al. . |
| 5,031,471 | 7/1991 | Watanabe . |
| 5,045,741 | 9/1991 | Dvorsky . |
| 5,063,317 | 11/1991 | Bruhn . |
| 5,182,957 | 2/1993 | Bohmer et al. . |
| 5,214,440 | 5/1993 | Takahashi et al. . |
| 5,218,255 | 6/1993 | Horiguchi . |
| 5,222,775 | 6/1993 | Kato . |
| 5,228,239 | 7/1993 | Heo . |
| 5,251,114 | 10/1993 | Cantin et al. . |
| 5,274,875 | 1/1994 | Chou . |
| 5,291,109 | 3/1994 | Peter . |
| 5,315,735 | 5/1994 | I-Shin . |
| 5,333,351 | 8/1994 | Sato . |
| 5,355,061 | 10/1994 | Forhan . |
| 5,355,286 | 10/1994 | Flint . |
| 5,373,605 | 12/1994 | Austin . |
| 5,427,345 | 6/1995 | Yamakami et al. . |
| 5,462,337 | 10/1995 | Yamakami . |
| 5,519,258 | 5/1996 | Stroven et al. . |
| 5,528,959 | 6/1996 | Yamakami . |
| 5,531,132 | 7/1996 | Koshino . |
| 5,691,586 | 11/1997 | Yonnet et al. . |
| 5,694,812 | 12/1997 | Maue et al. . |
| 5,730,028 | 3/1998 | Maue et al. . |
| 5,764,010 | 6/1998 | Maue et al. ..................... 15/250.16 X |
| 5,844,382 | 12/1998 | Dan . |

OTHER PUBLICATIONS

A paper from the Third Conference on Mechanisms, "Designing for Intermittent Motion with Modified Starwheels", Karl E. Kist, pp. 16–20.

"Mechanisms for Engineering Design" "Motion, Circular, Intermittent", Chapter 3, S.B. Tuttle, John Wiley Co., pp. 33–51.

Machine Design, "Modifying Starwheel Mechanisms", Vandeman and Wood, Apr. 1953, pp. 255–261.

"Kinematics of Intermittent Mechanism III—The Spherical Geneva WHeel", Product Engineering, Oct. 1949, S. Rappaport, pp. 137–139.

Machine Design, "Mechanical Systems", Jun. 1992, pp. 130, 132, 168.

"Mechanisms and Dynamics of Machinery", Hamilton H. Mabie and Fred W. Ocvirk, John Wiley & Sons, 1957.

A paper from the International Congress & Exposition, SAE Technical Paper Series 960390, "Liftgate Multiplexed Node", Feb., 1996, H. Winston Maue, pp. 73–76.

Patent Abstracts of Japan, vol. 016, 7–438 (M–1309), Sep. 11, 1992 for JP Patent Publication No. 04151351.

P. 100, *Machine Design*, 60 (1988) Oct. 13, No. 24, Cleveland, Ohio, US.

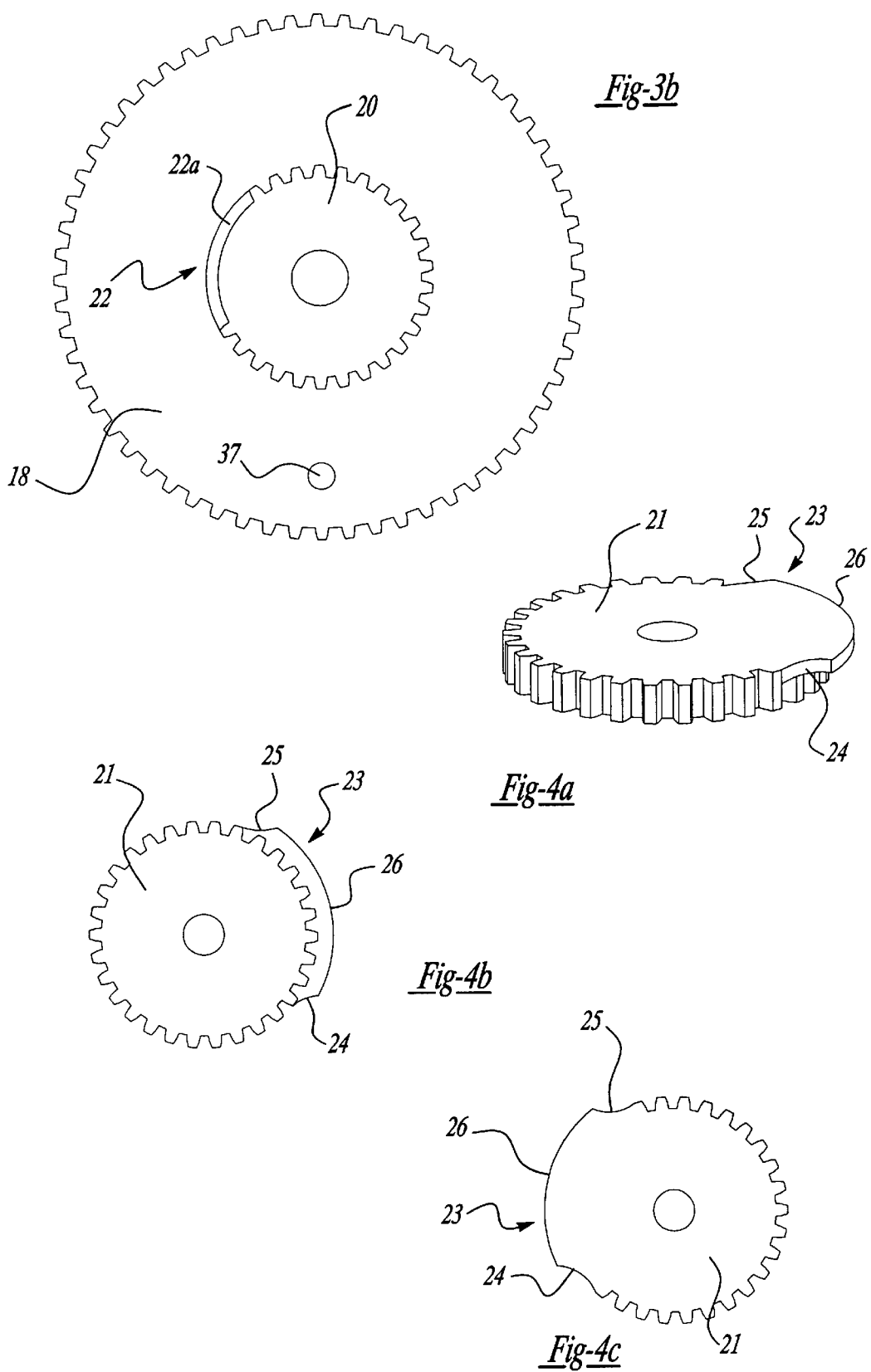

GEAR DRIVE WINDOW WIPER AND MULTI-FUNCTION ELECTRIC MOTOR

BACKGROUND OF THE INVENTION

This invention relates generally to multi-functional apparatuses and specifically to a gear drive window wiper and multi-function electric motor for use in an automotive vehicle.

Almost all automotive vehicles have a single or a pair of windshield wiper assemblies. These assemblies traditionally include rubber wiper blades mounted upon claw brackets. These claw brackets are attached to wiper arms mounted upon rotating shafts. These shafts are either directly driven by electric motors or driven by a single electric motor which actuates series or parallel-coupled four-bar linkage mechanisms. It is further known to provide a wiper system in combination with a wash device, to clean headlamps for automotive vehicles.

It is also common to employ a window wiper assembly for cleaning rear windows of automotive vehicles. Typically, these types of rear window wiper assemblies include a wiper blade mounted upon a bracket which is coupled to a wiper arm. The wiper arm is attached to a wiper shaft rotatably driven in a cyclical oscillating manner by a helical gear. A reversible, fractional horsepower, dc electric motor serves to actuate the helical gear through an armature shaft-mounted worm gear enmeshed therewith. This type of rear window wiper arrangement is usually mounted upon a pivoting liftgate of a minivan, station wagon, sport-utility vehicle or the like. Examples of conventional window wiper assemblies and motor mechanisms are disclosed within the following U.S. Pat. Nos.: 4,893,039 entitled "Windshield Wiper Motor" which issued to Isii on Jan. 9, 1990; 4,878,398 entitled "Driving Device for Window Wiper of Motor Vehicles" which issued to Heinrich on Nov. 7, 1989; 4,336,482 entitled "Rear Window Wiper Motor Control" which issued to Goertler et al. on Jun. 22, 1982; 4,259,624 entitled "Arrangement for Wiping a Vehicle Window" which issued to Seibicke on Mar. 31, 1981; 3,694,723 entitled "Motor Vehicle Windshield Wiper Having a Parking Position Outside the Wiper Area" which issued to Schneider et al. on Sep. 26, 1972; and, 3,665,772 entitled "Windshield Wiper Motor Link Depressed Park Mechanism" which issued to Beard et al. on May 30, 1972. All of these patents are incorporated by reference herewithin.

Some conventional vehicles also provide a rear window release lock or latch, actuated by a solenoid, which can be unlocked to allow for upward pivotal movement of the rear window in relation to the otherwise stationary liftgate. In combination therewith, a separate liftgate lock is often mounted upon the liftgate door for fastening the liftgate to the body to prevent inadvertent pivotal opening. This liftgate lock is traditionally operated by manual key or handle rotation, or through a separate electric motor or solenoid.

Additionally, separate motors and solenoids are required to actuate passenger door locks, an antenna retraction mechanism, headlamp cover retraction mechanisms, a fuel filler door lock and other similar functions. The traditional need for such a multiplicity of electromagnetic devices has increased the automotive vehicle weight and cost while further proving difficult to package within the often small spaces provided. This added weight is especially detrimental when the window wiper mechanism, rear window lock and liftgate lock, as well as their distinct respective electromagnetic devices, are all incorporated within the pivoting liftgate. Not only is the piece cost increased due to this multiplicity of electromagnetic devices, but the assembly cost, part number proliferation and handling costs, electrical wiring costs, objectional motor noise, and failure modes are increased.

Recently, a multi-functional apparatus employing an intermittent motion mechanism has been proposed. A single electromagnetic device selectively causes movement of the intermittent motion mechanisms thereby moving mechanical devices coupled thereto. In a specific embodiment, the armature shaft of an electric motor rotates a worm gear segment which then drives a helical gear mounted in a gear housing. Via a series of pins, cams and gears, also mounted in the housing, this input can be made to drive selectively two or three intermittent rotary motion mechanisms according to the rotary position of the helical gear. Mechanical devices which are coupled to the intermittent rotary motion mechanisms, e.g., a rear window wiper, a liftgate lock and a liftgate window release lock, are therefore operated according to the positional range of oscillation or movement of the helical gear. In this way, the number of electromagnetic devices, or motors, required to be fitted to a vehicle liftgate is reduced. An example of this apparatus is disclosed in U.S. patent application Ser. No. 08/430,388 to Zimmer et al. which was filed on Apr. 28, 1995 now U.S. Pat. No. 5,841,249, the entire disclosure of which is hereby incorporated by reference.

Additionally, a multi-functional apparatus employing an electromagnetic device has been proposed. To save weight and space and reduce costs in a vehicle, a multi-functional apparatus is used in place of a plurality of single-function devices. The multi-functional apparatus employs a single electromagnetic device to selectively actuate a plurality of intermittent motion mechanisms, thereby operating mechanical devices attached thereto. In a specific example, a reversible dc electric motor selectively drives a rear window wiper via a transmission, a clutch and a driven shaft. By rotating the transmission member beyond the rotational range for operating the wiper, drive to the wiper is disengaged and a locking mechanism for the rear window or liftgate can also be actuated by the rotating transmission member. In another aspect, a single electric motor selectively actuates three intermittent motion mechanisms thereby causing three mechanical devices coupled thereto to operate (e.g., rear window and liftgate locking mechanisms and a window wiper). An example of this apparatus is disclosed in U.S. patent application Ser. No. 08/431,148 to Maue et al. which was filed on Apr. 28, 1995 and is now U.S. Pat. No. 5,694,812.

Finally, a control system for an automotive vehicle multi-functional apparatus has been proposed. A control system for an automotive vehicle multi-functional apparatus employs an electronic control unit operably controlling a rear window wiper assembly. In another aspect, an electronic control unit is operable as a multiplexed rear node for controlling a variety of liftgate devices and functions. electromagnetic device. The multi-functional electromagnetic device uses intermittent motion mechanisms to selectively operate differing devices driven therefrom. A method of operating the electronic control unit is also provided. An example of this system is disclosed in U.S. patent application Ser. No. 08/431,149 to Maue et al. which was filed on Apr. 28, 1995 and is now U.S. Pat. No. 5,764,010.

SUMMARY OF THE INVENTION

In accordance with the present invention, the preferred embodiment of a multi-functional apparatus employs a gear drive window wiper and multi-function electric motor. The electric motor selectively causes movement of an intermittent motion mechanism thereby moving a mechanical device coupled thereto. In another aspect of the present invention a pair of intermittent rotary motion mechanisms are selectively rotated by a single reversible electric motor. In a further aspect of the present invention, a single electric motor selectively actuates three intermittent rotary motion mechanisms thereby causing three mechanical devices coupled thereto to operate. In a still further aspect of the present invention, one intermittent rotary motion mechanism is actuated when the electric motor is operated in a first direction, and the other two intermittent rotary motion mechanisms are actuated when the electric motor is operated in a second direction, the second direction being opposite the first direction. In yet another aspect of the present invention, it is impossible to actuate one intermittent rotary motion mechanism when the other two intermittent rotary mechanisms are being actuated.

The multi-functional apparatus of the present invention is advantageous over conventional systems since the present invention combines many different functions into a single apparatus. For example, the multi-functional apparatus of the present invention replaces the traditional separate rear wiper motor, liftgate lock motor and rear window latch solenoid. Accordingly, the multi-functional apparatus significantly reduces the piece cost, assembly cost, part proliferation and handling costs, wiring costs, and battery current consumption as compared to conventional constructions. Furthermore, the multi-functional apparatus of the present invention significantly reduces weight and packaging space requirements while increasing the electrical and mechanical reliability of the affected systems. Objectional motor and solenoid noises are also reduced. Moreover, the present invention provides a means for mechanically locking the intermittent motion mechanisms and devices coupled thereto in fixed positions. Additional advantages and features of the present invention will become apparent from the following description and appended claims, taken in conjunction with the accompanying drawings.

BRIEF DESCRIPTION OF THE DRAWINGS

FIG. 3b is a rear elevational view of the gear system shown in FIG. 3a employed in the preferred embodiment of the present invention;

FIG. 4a is a perspective view of another gear system employed in the preferred embodiment of the present invention;

FIG. 4b is a front elevational view of the gear system shown in FIG. 4a employed in the preferred embodiment of the present invention;

FIG. 4c is a rear elevational view of the gear system shown in FIG. 4a employed in the preferred embodiment of the present invention;

DETAILED DESCRIPTION OF THE PREFERRED EMBODIMENT

Figure 1:
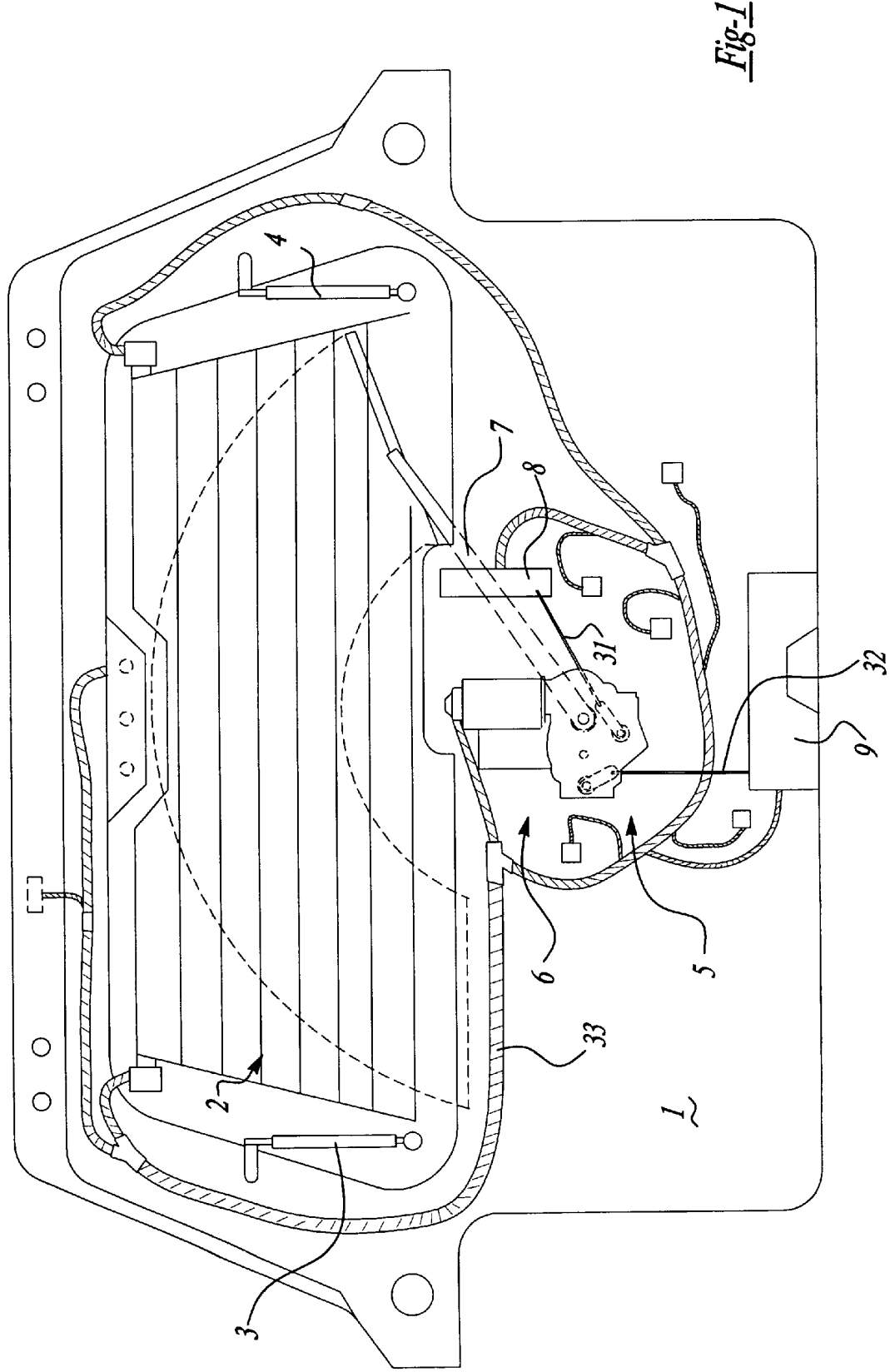
FIG. 1 is a front elevational view showing the preferred embodiment of a gear drive window wiper and multi-function electric motor of the present invention.

An automobile vehicle, such as a minivan, station wagon, sport utility vehicle or the like, has a rear liftgate door which can pivot about an upper pair of hinges coupled to the vehicle body structure. When the liftgate is pivoted to an open position, a cargo space is accessible from behind the vehicle. Such a liftgate is shown in FIG. 1. Liftgate 1 has a rear window or backlite 2 pivotable between a closed position, substantially flush with the outer surface of liftgate 1, to an open position about upper hinges. A pair of pneumatic cylinders 3 and 4 act to push window 2 toward the open position when a lower portion of window 2 is released. The preferred embodiment of a gear drive window wiper and multi-function electric motor 5 of the present invention is mounted upon an outer surface of liftgate 1. A majority of apparatus 5 may be hidden by an interior exterior trim panel (not shown). Apparatus 5 primarily includes a central drive and power transmission unit 6, a window wiper assembly 7, a window release latch or lock 8, and a liftgate lock 9, all of which are mounted upon liftgate 1. Examples of such locks (employing separate solenoids or motors, which would be removed in order to couple the lock mechanism for use with the present invention) are disclosed within the following U.S. Pat. Nos.: 5,222,775 entitled "Power Operated Latch Device for Automotive Back Door" which issued to Kato on Jun. 29, 1993; 4,422,522 entitled "Inertial Lock for Vehicle Door Latch" which issued to Slavin et al. on Dec. 27, 1983; and, 3,917,330 entitled "Electric Lock Release" which issued to Quantz on Nov. 4, 1975, the entire specifications of which are incorporated herein by reference.

Figure 2:
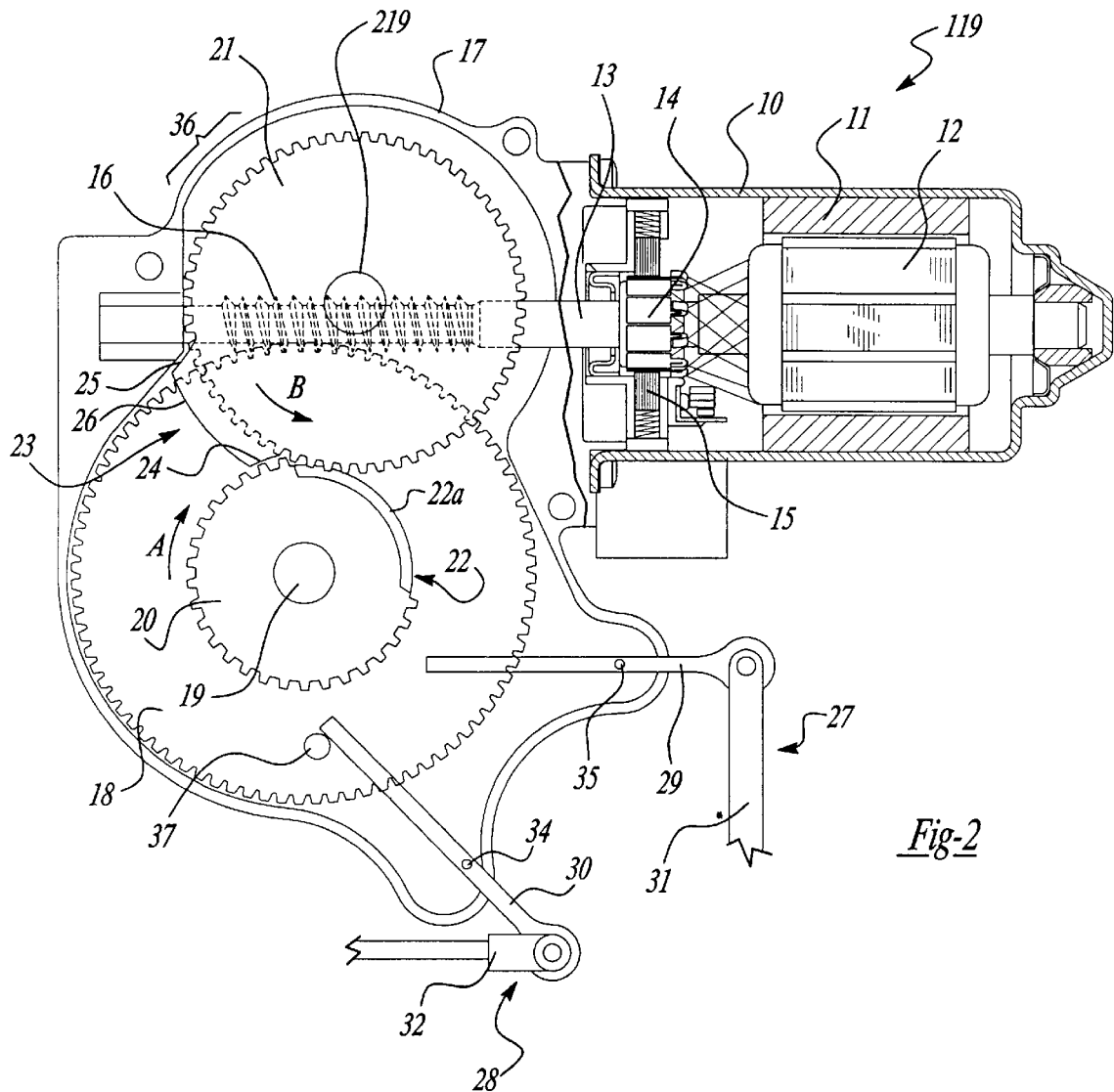
FIG. 2 is a rear elevational view, with portions broken away therefrom, showing the preferred embodiment of a gear drive window wiper and multi-function electric motor of the present invention.

The construction of central drive and power transmission unit 6 is best illustrated in FIG. 2. An electric motor 119 is of a conventional 12 volt fractional horsepower, dc electromagnetic variety having a metallic motor housing 10 within which are stationary permanent magnets (stator) 11, a rotatable armature 12 with wire windings, a rotatable armature shaft 13 joined to armature 12, a commutator 14 electrically connected to the wire windings and rotatable with armature shaft 13, a brush card assembly 15 and various electronic components, bushings and retainers. A worm gear segment 16 is provided upon a portion of armature shaft 13 extending beyond motor housing 10.

A gear housing 17 is also provided for receiving worm gear segment 16 and the immediately adjacent portions of armature shaft 13. A first worm gear 18 is also housed and rotatably journalled within gear housing 17. Gear housing 17 is preferably made from cast aluminum. A plurality of knurled steel cross shafts 19 are press fit or otherwise attached within machined openings of gear housing 17. The placement of these openings in relation to each other is important. Pins 19 can alternatively be molded as part of plastic gears and cams.

Figure 3A:
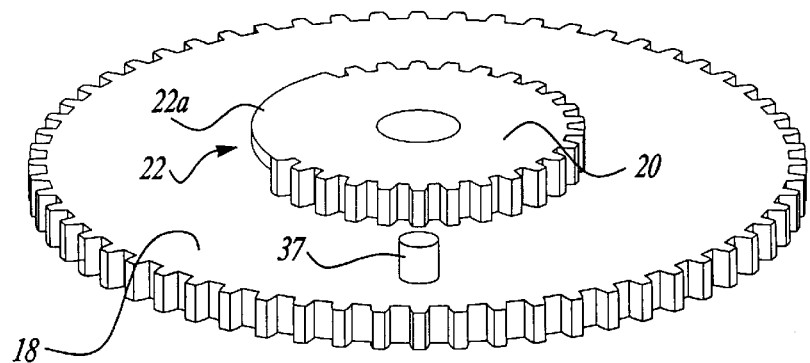
FIG. 3a is a perspective view of a gear system employed in the preferred embodiment of the present invention.

Referring specifically to FIGS. 3a–3b, first worm gear 18 has an external set of helically oriented teeth projecting entirely therearound for meshing with worm gear segment 16. A second gear 20 is mounted upon a face of first worm gear 18 for rotating therewith. It is important to note that the rotation of second gear 20 is dependent on first worm gear 18. In other words, second gear 20 can not rotate without first worm gear 18 rotating simultaneously. Second gear 20 has an external set of helically oriented teeth projecting a portion therearound for meshing with third gear 21. Second gear 20 also has a toothless area or toothless gear portion 22 that does not mesh with third gear 21. This toothless gear portion preferably includes a raised lip portion 22a. This raised lip portion 22a preferably engages with surface 24 of stop 23, as will be fully explained below. Toothless gear portion 22 comprises about 5 to about 270 degrees of the 360 degree circle that defines a periphery of second gear 20. In a preferred embodiment of the present invention, toothless gear portion 22 comprises about 99 degrees of the 360 degree circle that defines a periphery of second gear 20. First worm gear 18 and second gear 20 are coaxially aligned for rotation about their common cross shaft 19. A drive pin 37 having a driving interface surface projects from a face of first worm gear 18 at a height below the cross shaft 219 so as to allow first worm gear 18 to rotate freely about third gear 21.

Referring specifically to FIGS. 4a–4c, third gear 21 has an external set of helically oriented teeth projecting entirely therearound for meshing with the teeth of the second gear 20. Third gear 21 also has a protuberance or stop 23, preferably on the top surface of gear 21, projecting horizontally outward away from the central axis of third gear 21. Stop 23 is comprised of two side surfaces 24 and 25 and a rear surface 26. Surface 24 is comprised of a relatively smooth surface and has a curvature which is compatible with the curvature of toothless gear portion 22 of second gear 20. In other words, toothless gear portion 22, specifically raised lip portion 22a, is able to smoothly engage and slide by surface 24 without any enmeshment occurring between the two. Additionally, this feature aids in preventing third gear 21 from falling out of proper position. Preferably, the radius of stop 23 is equal to the radius of toothless gear portion 22. Stop 23 is configured in such a manner as to allow first worm gear 18 and second gear 20 to rotate freely about third gear 21. The primary purpose of stop 23 is to provide a means for allowing rotation of first worm gear 18 and second gear 20, but to prevent the simultaneous rotation of third gear 21. Thus, by allowing rotation of first worm gear 18 and second gear 20, various intermittent rotary motion mechanisms coupled thereto can be actuated, while at the same time preventing the actuation of any intermittent rotary motion mechanisms which are coupled to third gear 21. Stop 23 prevents rotation of third gear 21 by physically abutting against an interior surface of gear housing 17. Thus, if third gear 21 attempts to rotate clockwise from its position in FIG. 2, stop 23 will immediately be urged against, or abutted by the interior wall of gear housing 17. In this position, apparatus 5 is ready to engage in the actuation of the other intermittent rotary motion mechanisms coupled to the other gears, preferably first worm gear 18.

The second and third intermittent rotary motion mechanisms 27 and 28 cooperate with first worm gear 18 and its associated drive pin 37. Second and third intermittent rotary motion mechanisms 27 and 28 can comprise a window release latch actuator or a liftgate unlock/lock actuator, respectively. However, it should be appreciated that any number or type of various intermittent rotary motion mechanisms can be coupled to first worm gear 18. In accordance with one embodiment of the present invention, second and third intermittent rotary motion mechanisms 27 and 28 are actuators that are comprised of spring-biased lever systems. However, it should be appreciated that any number or type of suitable devices may be employed as actuators for the intermittent rotary motion mechanisms. Thus, when one lever section, 29 or 30, respectively, is actuated, either by raising, lowering, extending vertically, or extending horizontally that lever section, a force is transmitted to the lower lever section, 31 or 32, respectively, which actuates the lock, unlock, or unlatch function of the window release latch or lock 8 or the liftgate lock 9, respectively.

In accordance with one embodiment of the present invention, it is envisioned that an output shaft is rotatably connected, through various mechanical devices such as gears, cams, pinions, to the cross shaft 219 of third gear 21. The output shaft would then be connected to a wiper arm, which would house or receive a wiper blade, preferably made of rubber. In response to rotation of third gear 21, the output shaft would transfer this rotary motion eventually to the wiper arm, thus allowing the wiper blade to wipe the window of the automobile in an arcuate and oscillating manner. The output shaft, the wiper arm, and the wiper blade are generally referred to as the wiper assembly. The wiper assembly is generally referred to as an intermittent rotary motion mechanism, because of its ability to actuated only when required or needed.

Referring now to FIG. 2, the operation of the window assembly 7 will now be described. In this position, the wiper assembly is said to be in a parked position, or alternatively, in a park position. As is clearly illustrated, stop 23 is abutting up against an interior wall of gear housing 17. In order to begin the wiping operation, an actuator, typically on the instrument panel or other control panel of an automobile is actuated. This causes electric motor 119 to energize stator 11, which in turn causes armature 12 to rotate, which in turn causes armature shaft 13 to rotate, which in turn causes worm gear segment 16 to rotate. As worm gear segment 16 rotates it causes first worm gear 18 to rotate clockwise in the direction of arrow A. As previously discussed, the rotation of first worm gear 18 also causes second gear 20 to rotate. The teeth of second gear 20 engage the teeth of third gear 21 causing third gear 21 to rotate counterclockwise in the direction of arrow B. As third gear 21 rotates, the window assembly 7, which is attached to the cross shaft 219 of third gear 21, also rotates, thus causing the wiping operation of the window. Third gear 21 continues to rotate counterclockwise until a surface of the stop 23 abuts an interior wall of gear housing 17, probably in area designated as 36. When this occurs, electric motor 9 reverses polarity, and rotates first worm gear 18 counterclockwise, which then causes second gear 20 to rotate counterclockwise, which then causes third gear 21 to rotate clockwise, thus returning third gear 21 to the parked position. This is generally referred to as the return stroke or the return wipe stroke. This entire operation can then be repeated (e.g., in rainy conditions) or the wiper assembly can then be shut off (e.g., once the rainy conditions have subsided).

Figure 5:
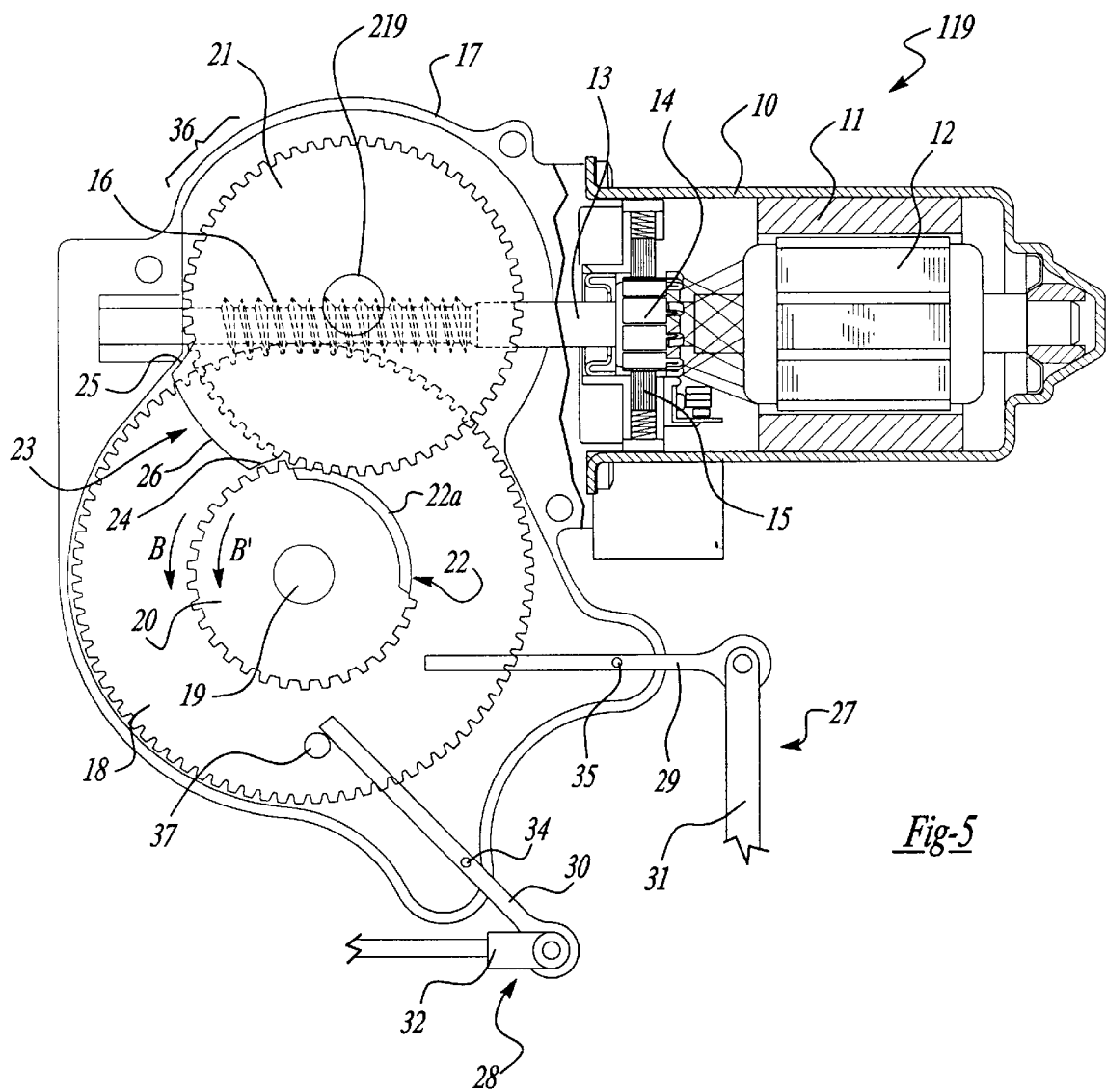
FIG. 5 is a rear elevational view, with portions broken away therefrom, showing the beginning of the liftgate unlock actuation of the preferred embodiment of the present invention.

The operation of the liftgate unlock/lock function and the window release latch function will now be described with reference to FIGS. 5–10. Referring specifically to FIG. 5, first worm gear 18 is rotated counterclockwise in the direction of arrow B. Second gear 20 also rotates counterclockwise in the direction of arrow B'. However, because toothless gear portion 22 is rotating against surface 24 of stop 23, there is no rotation of third gear 21, thus there can be no actuation of the wiper assembly 7. As first worm gear 18 rotates, drive pin 37 is urged up against lever portion 30 in preparation for the actuation of the unlocking function of liftgate unlock/lock mechanism 9.

Figure 6:
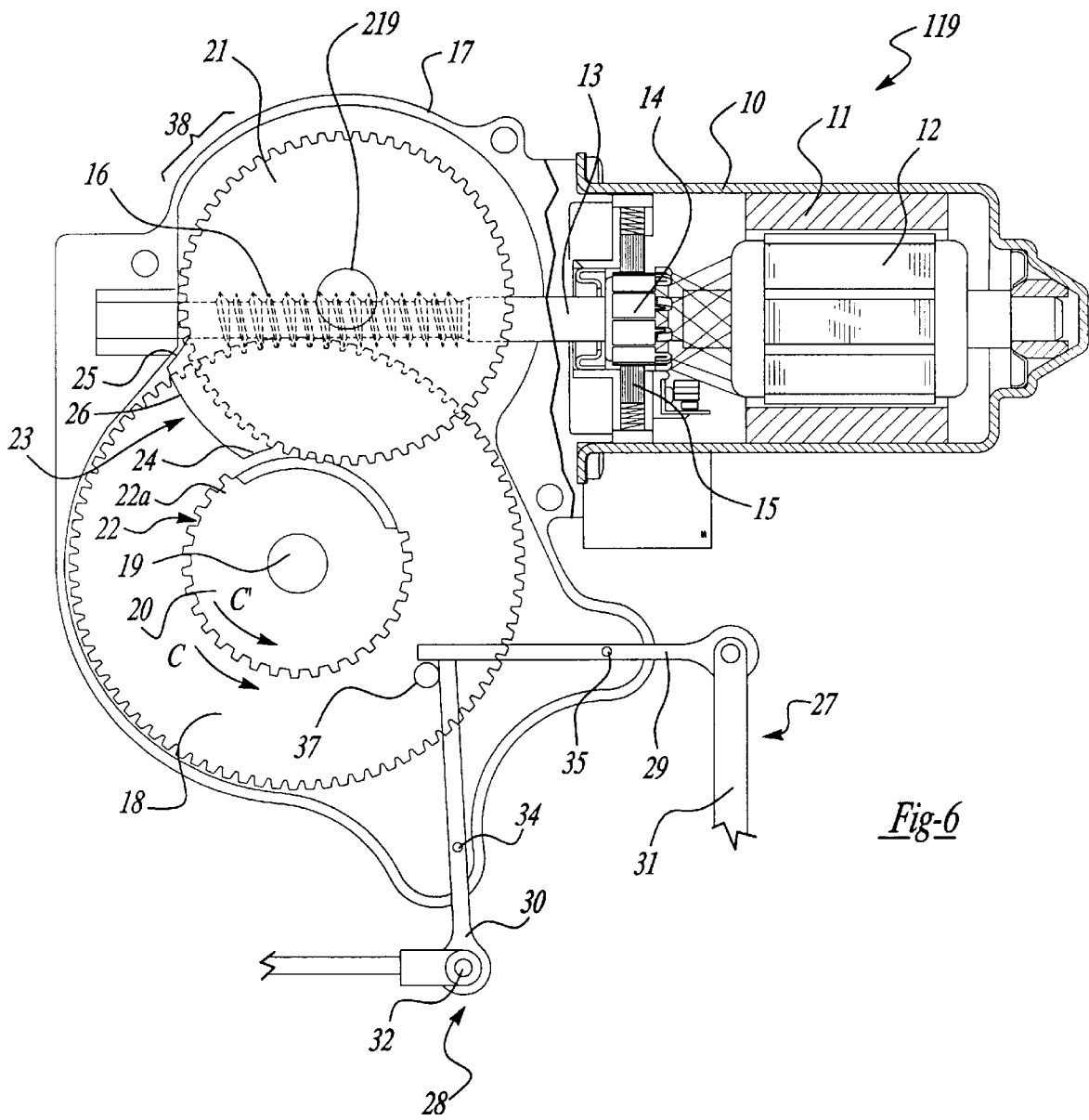
FIG. 6 is a rear elevational view, with portions broken away therefrom, showing the actuation of the unlock function of the liftgate unlock/lock mechanism of the preferred embodiment of the present invention.

Referring specifically to FIG. 6, first worm gear 18 is further rotated counterclockwise in the direction of arrow C. Second gear 20 also rotates counterclockwise in the direction of arrow C'. There is still no rotation of third gear 21, thus there can be no actuation of the wiper assembly 7. As first worm gear 18 further rotates, drive pin 37 is urged further up against lever portion 30 actuating the unlocking function of liftgate unlock/lock mechanism 9. The actuation is caused by lever portion 30 transferring the force of drive pin 37 downwardly toward lever portion 32 by means of a pivot pin 34. This downward force causes lever portion 32 to extend horizontally outward, thus actuating the unlocking function of liftgate unlock/lock mechanism 9.

Figure 7:
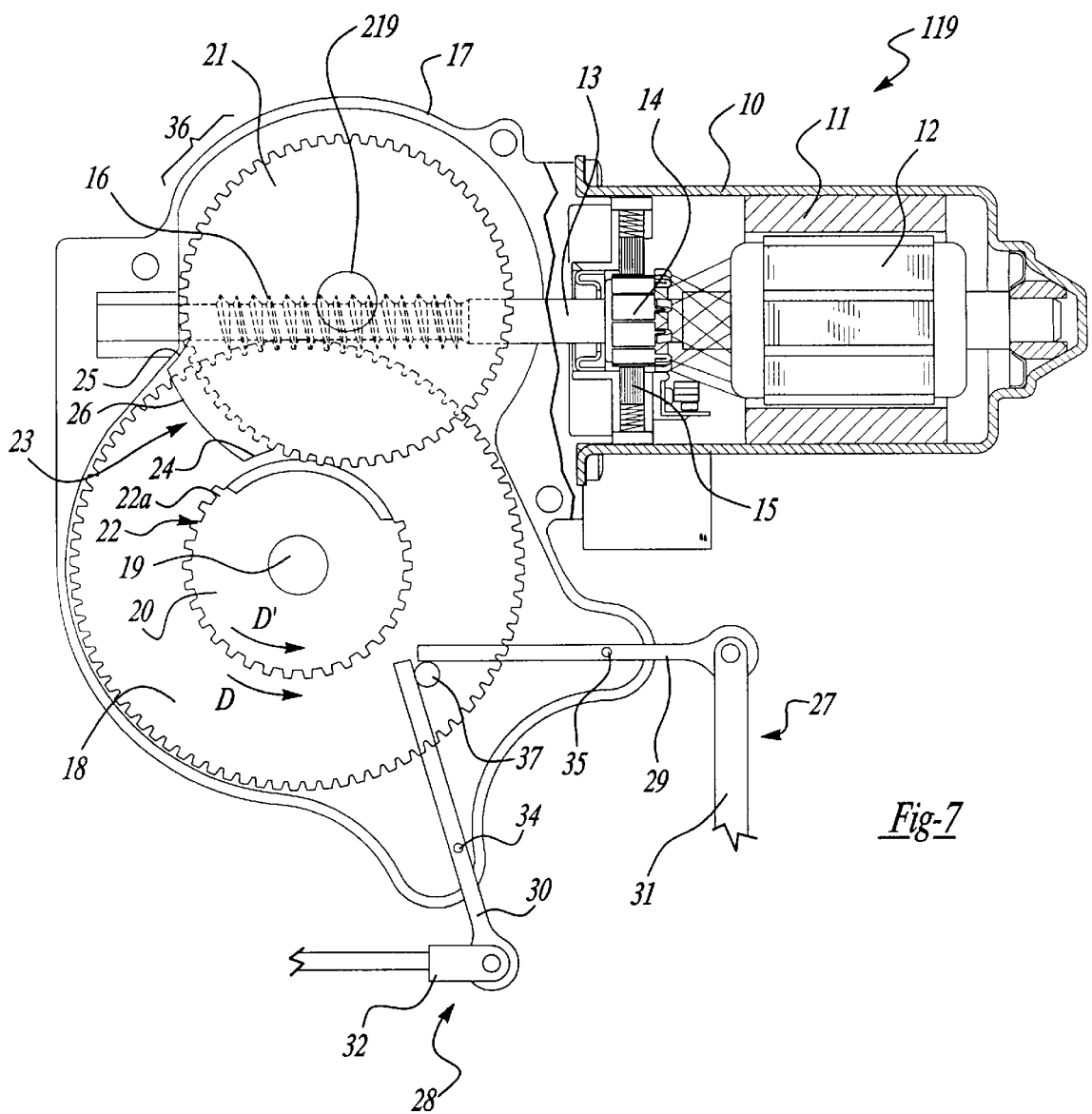
FIG. 7 is a rear elevational view, with portions broken away therefrom, showing the beginning of the window release latch actuation of the preferred embodiment of the present invention.

Referring specifically to FIG. 7, first worm gear 18 is still further rotated counterclockwise in the direction of arrow D. Second gear 20 also rotates counterclockwise in the direction of arrow D'. There is still no rotation of third gear 21, thus there can be no actuation of the wiper assembly 7. As first worm gear 18 still further rotates, drive pin 37 passes lever portion 30. However, lever portion 30 does not return to its initial position as shown in FIG. 4, but rather assumes a position in between its initial position and its actuation position. Drive pin 37 is now urged up against lever portion 29 in preparation for actuating the window release latch function of window release latch mechanism 8.

Figure 8:
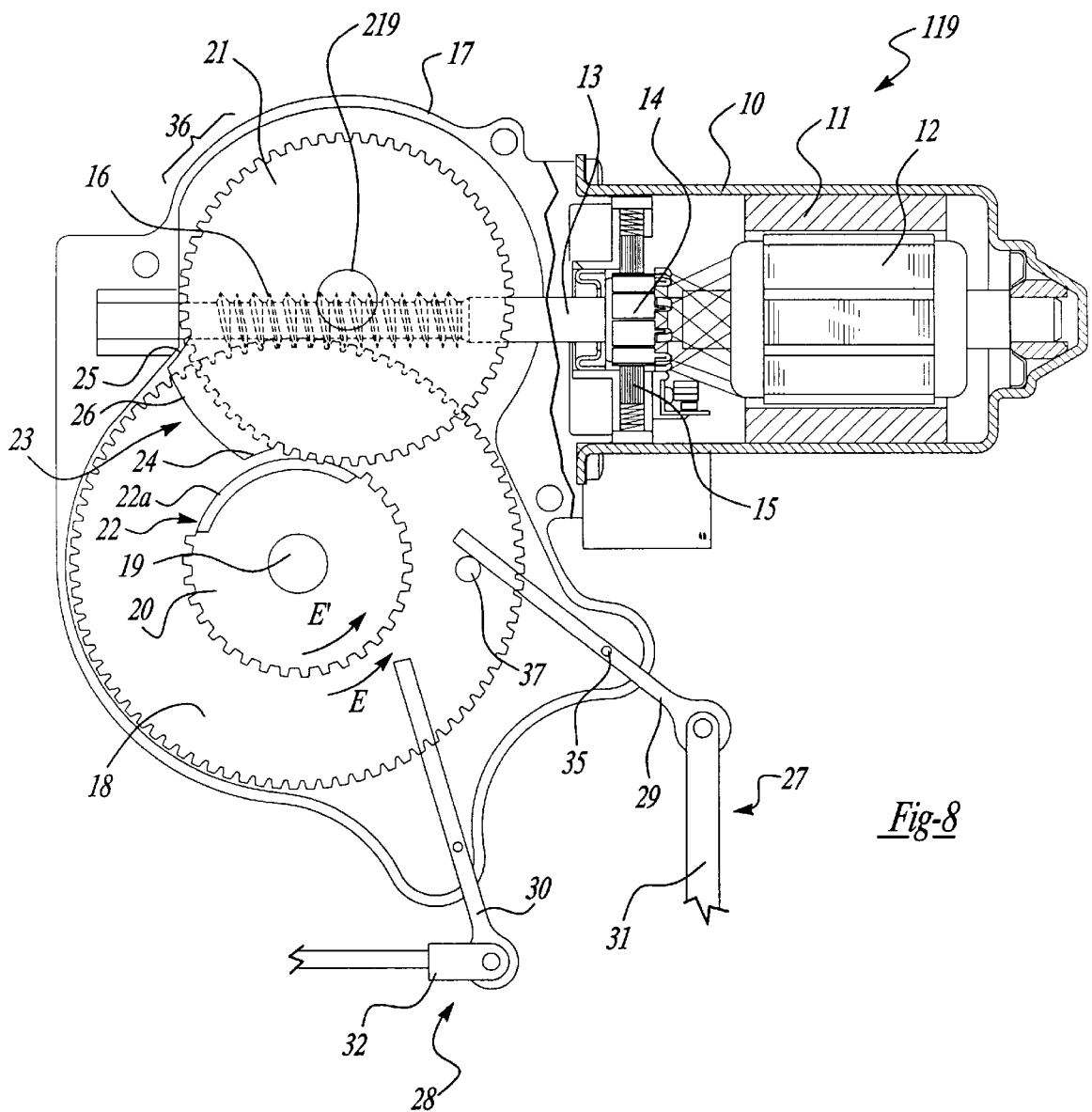
FIG. 8 is a rear elevational view, with portions broken away therefrom, showing the actuation of the window release latch mechanism of the preferred embodiment of the present invention.

Referring specifically to FIG. 8, first worm gear 18 is yet still further rotated counterclockwise in the direction of arrow E. Second gear 20 also rotates counterclockwise in the direction of arrow E'. There is still no rotation of third gear 21, thus there can be no actuation of the wiper assembly 7. As first worm gear 18 yet still further rotates, drive pin 37 is urged further up against lever portion 29 actuating the window release latch function of window release latch mechanism 8. The actuation is caused by lever portion 29 transferring the force of drive pin 37 downwardly toward lever portion 31 by means of a pivot pin 35. This downward force causes lever portion 31 to extend vertically downward, thus actuating the window release latch function of window release latch mechanism 8. At this point the polarity of electric motor 119 is reversed in preparation for returning first worm gear 18 and second gear 20 to the park position.

Figure 9:
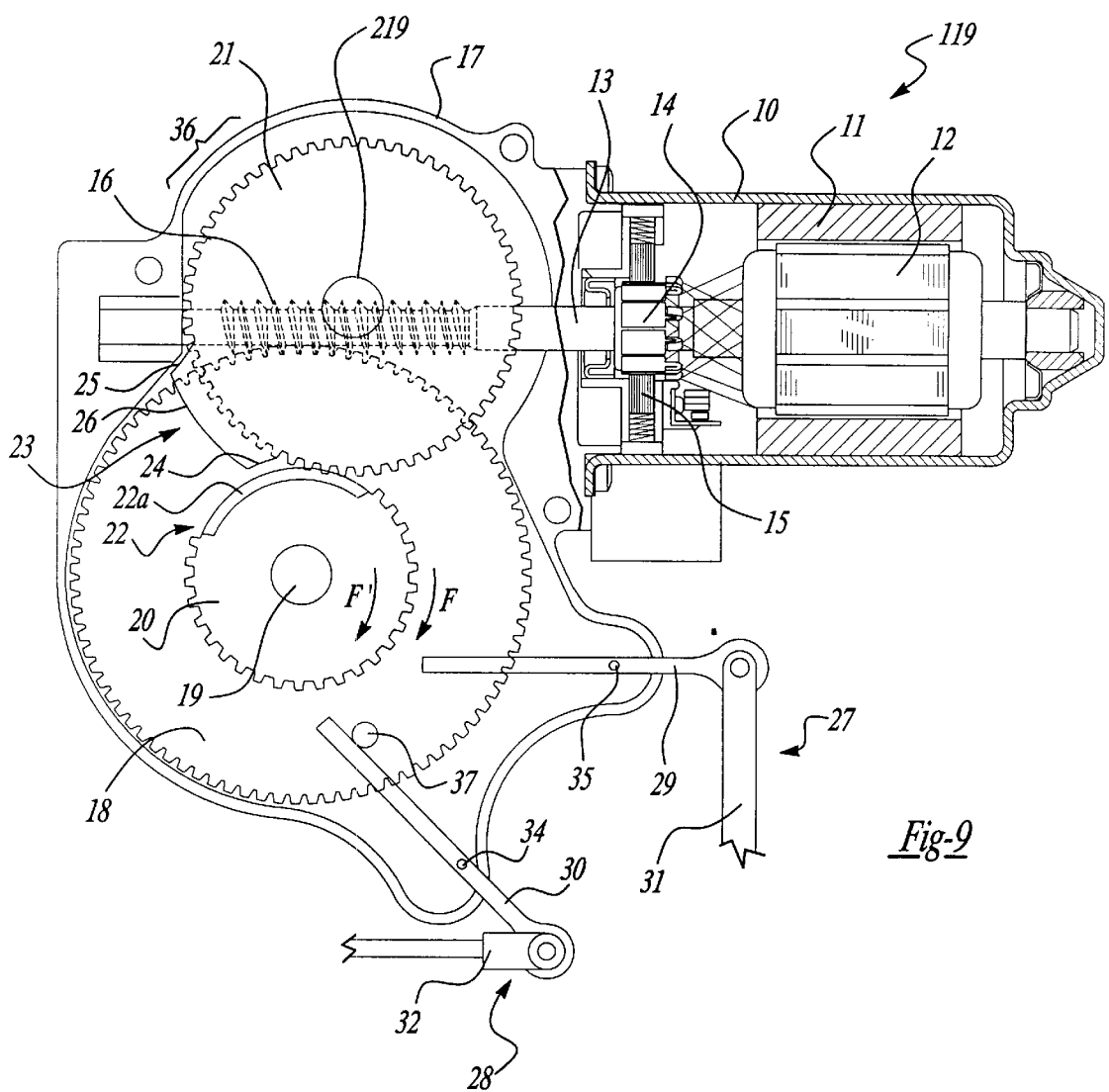
FIG. 9 is a rear elevational view, with portions broken away therefrom, showing the beginning of the lock function of the liftgate unlock/lock mechanism of the preferred embodiment of the present invention.

Referring specifically to FIG. 9, first worm gear 18 is rotated clockwise in the direction of arrow F. Second gear 20 also rotates clockwise in the direction of arrow F'. However, because toothless gear portion 22 is rotating against surface 24 of stop 23, there is still no rotation of third gear 21, thus there can be no actuation of the wiper assembly 7. As first worm gear 18 rotates, drive pin 37 is urged up against lever portion 30 in preparation for the actuation of the locking function of liftgate unlock/lock mechanism 9.

Figure 10:
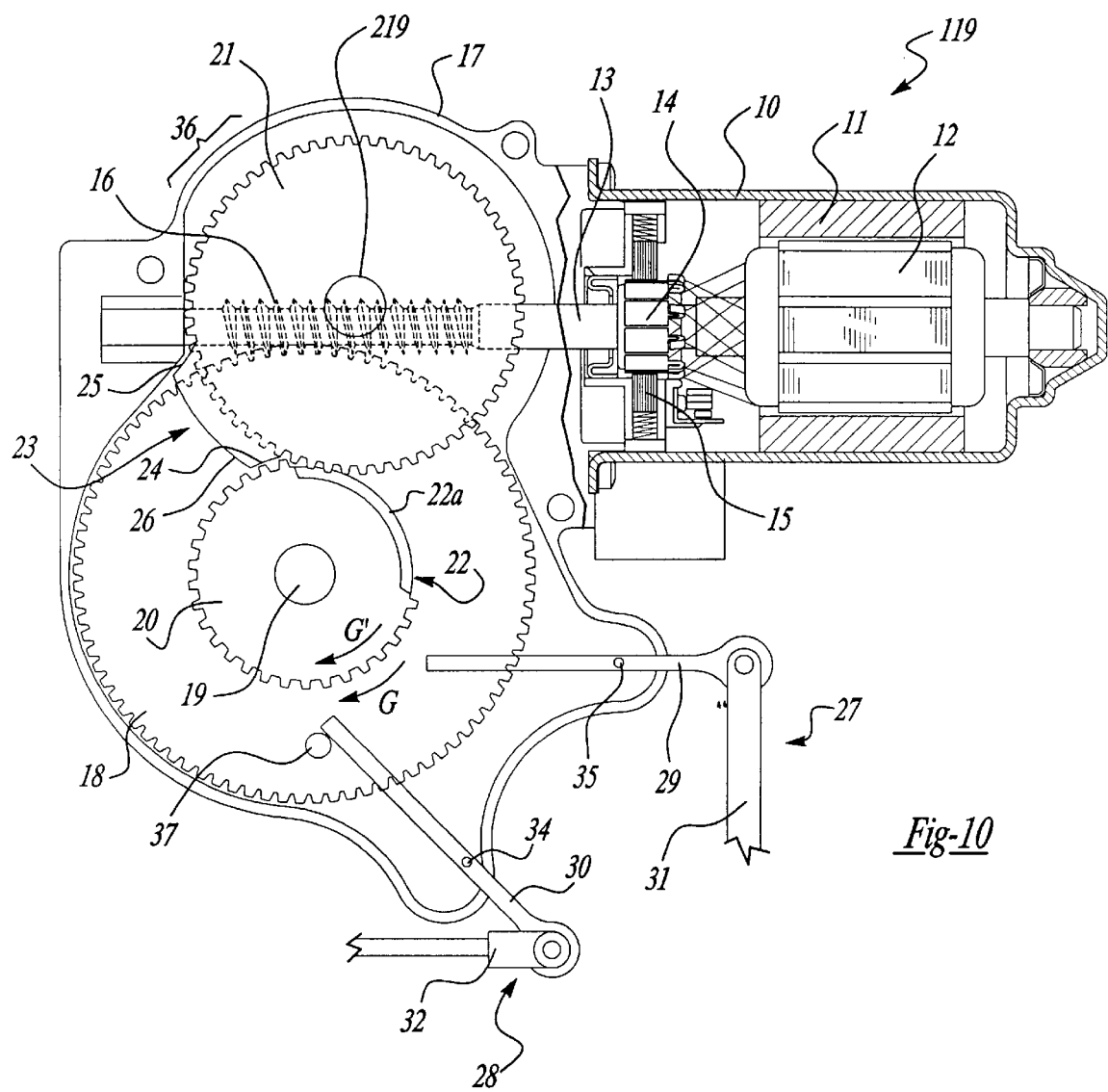
FIG. 10 is a rear elevational view, with portions broken away therefrom, showing the actuation of the lock function of the liftgate unlock/lock mechanism of the preferred embodiment of the present invention.

Referring specifically to FIG. 10, first worm gear 18 is further rotated clockwise in the direction of arrow G. Second gear 20 also rotates clockwise in the direction of arrow G'. There is still no rotation of third gear 21, thus there can be no actuation of the wiper assembly 7. As first worm gear 18 further rotates, drive pin 37 is urged further up against lever portion 30 actuating the locking function of liftgate unlock/lock mechanism 9. The actuation is caused by lever portion 30 transferring the force of drive pin 37 downwardly toward lever portion 32 by means of pivot pin 34. This downward force causes lever portion 32 to extend horizontally inward, thus actuating the locking function of liftgate unlock/lock mechanism 9. First worm gear 18 continues its clockwise movement until it returns to the park position of FIG. 2.

Various materials have been disclosed in an exemplary fashion, however, other materials may of course be employed. It is intended by the following claims to cover these and any other departures from the disclosed embodiments which fall within the true spirit of this invention.

The invention claimed is:

1. A multi-functional automotive vehicle apparatus, comprising:

a first rotatable member having a driving interface surface, said first rotatable member rotating about a central axis;

a second rotatable member rotating coaxially and concurrently with said first rotatable member;

a third rotatable member, said second rotatable member rotating a portion of said third rotatable member, said third rotatable member having a member for selectively preventing rotation of said third rotatable member;

an electromagnetic device selectively rotating said first rotatable member;

a first intermittent motion mechanism having a surface engagable with said driving interface surface of said first rotatable member for changing orientation of said first intermittent motion mechanism; and a second intermittent motion mechanism having a surface engagable with said driving interface surface of said first rotatable member for changing orientation of said second intermittent motion mechanism.

2. The multi-functional vehicle apparatus of claim 1, wherein said third rotatable member is a window wiper assembly.

3. The multi-functional vehicle apparatus of claim 1, wherein said first rotatable member includes a gear having a set of external teeth, said driving interface surface projecting substantially parallel to the central axis of said first rotatable member, said driving interface surface being a drive pin.

4. The multi-functional vehicle apparatus of claim 1, wherein said second rotatable member includes a gear, said gear having a first peripheral portion defining a toothless area, said gear having a second peripheral portion having a set of external teeth.

5. The multi-functional apparatus of claim 4, wherein a majority of the periphery of said gear has said external teeth.

6. The multi-functional apparatus of claim 1, wherein at least one of said intermittent motion mechanisms includes a pivotable lever.

7. The multi-functional vehicle apparatus of claim 4, wherein said third rotatable member includes a gear having a set of external teeth, said third rotatable member has a central axis, a substantially planar protuberance of said gear extends outwardly in a substantially horizontal plane away from the central axis of said third rotatable member, said protuberance is operable to engage said toothless area of said second rotatable member to maintain a desired position of one of said rotatable members.

8. The multi-functional apparatus of claim 7, wherein said protuberance is selectively operable to prevent the actuation of the window wiper assembly.

9. The multi-functional apparatus of claim 7, wherein said protuberance is selectively operable to prevent the actuation of the window wiper assembly during simultaneous actuation of the first intermittent motion mechanism.

10. The multi-functional apparatus of claim 7, wherein said protuberance is selectively operable to prevent the actuation of the window wiper assembly during simultaneous actuation of the second intermittent motion mechanism.

11. The multi-functional apparatus of claim 7, wherein said first intermittent motion mechanism is operable only when said toothless area of said second rotatable member cooperates with said protuberance of said third rotatable member.

12. The multi-functional apparatus of claim 7, wherein said second intermittent motion mechanism is operable only when said toothless area of said second rotatable member cooperaties with said protuberance of said third rotatable member.

13. A gear system for an electric motor, said system comprising:
- a first gear having a first peripheral portion defining a toothless area and a second peripheral portion having a set of external teeth, said first peripheral portion and said second peripheral portion being part of a common circle defining a periphery of said first gear;
- a second gear having a set of external teeth, said second gear having a central axis;
- a protuberance of said second gear extending outwardly in a horizontal plane away from the central axis of said second gear, said protuberance being selectively in contact with said toothless area of said first gear; and
- a lock release mechanism operably coupled to one of said gears.

14. The gear system of claim 13, wherein said lock release mechanism further includes means for actuating a liftgate release lock coupling member between a locked orientation and an unlocked orientation.

15. The gear system of claim 13, wherein said lock release mechanism further includes means for actuating a window release lock coupling member between a locked orientation and an unlocked orientation.

16. A multi-functional automotive system, comprising:
- a first gear having a central axis and a set of external teeth, said first gear having a driving interface surface projecting substantially parallel to the central axis of said first gear;
- a second gear having a first peripheral portion defining a toothless area and a second peripheral portion having a set of external teeth, said second gear rotating about the central axis of said first gear, the rotation of said second gear being dependent on the rotation of said first gear; and
- a third gear having a set of external teeth and a central axis, said third gear having a substantially planar protuberance extending outwardly in a horizontal plane away from the central axis of said third gear, said protuberance cooperating with said toothless area of said second gear.

17. The multi-functional automotive system of claim 16, further comprising a mechanism operably coupled to one of said gears, said mechanism being operable to actuate a liftgate release lock coupling member between a locked orientation and an unlocked orientation.

18. The multi-functional automotive system of claim 16, further comprising a mechanism operably coupled to one of said gears, said mechanism being operable to actuate a window release lock coupling member movable between a locked orientation and an unlocked orientation.

19. The multi-functional automotive system of claim 16, further comprising a wiper operably coupled to one of said gears and a remotely actuated mechanism operably coupled to one of said gears, said wiper and said mechanism being independently movable from each other.

20. The gear system of claim 13 further comprising a second automotive vehicle mechanism operably coupled to one of said gears, said mechanisms being independently movable from each other.

* * * * *